June 24, 1958 — G. L. SLUSSER — 2,840,128
REVERSIBLE ACTION CUTTING BIT ASSEMBLY
Filed May 10, 1957
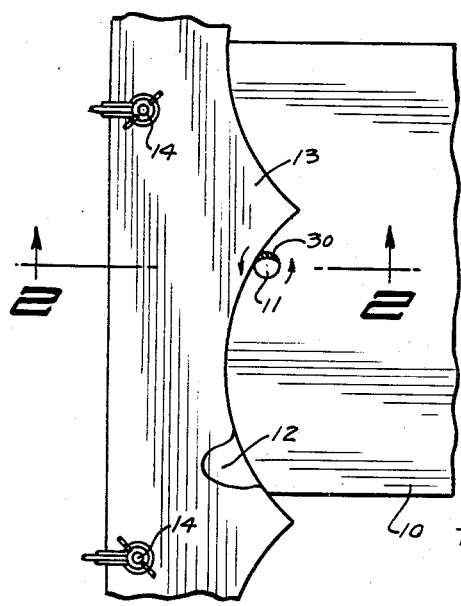
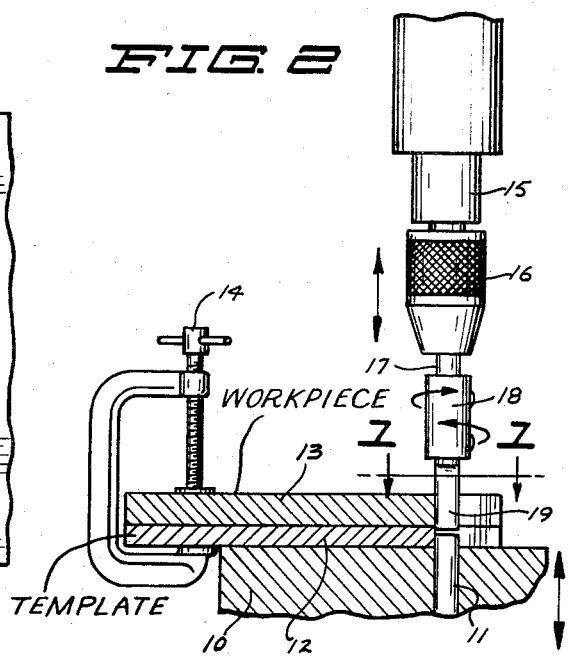
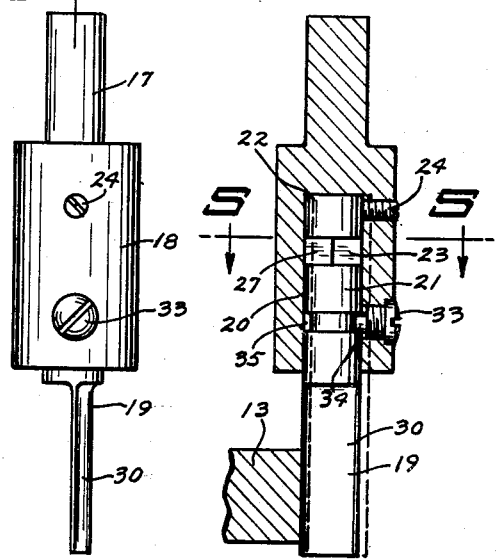
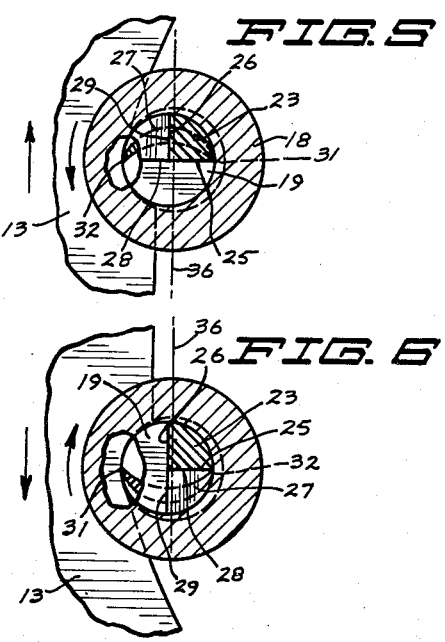
INVENTOR.
GEORGE L. SLUSSER
BY
Braddock and Braddock
ATTORNEYS

United States Patent Office 2,840,128
Patented June 24, 1958

2,840,128
REVERSIBLE ACTION CUTTING BIT ASSEMBLY

George L. Slusser, Minneapolis, Minn.

Application May 10, 1957, Serial No. 658,282

2 Claims. (Cl. 144—241)

The invention herein has relation to a cutting bit assembly of novel and improved construction which can be employed for a variety of purposes but which has been devised to be especially useful for the purpose of producing scrolls, etc., in wood.

In the woodworking art it is necessary when producing scrolls to cause the cutting edges of the operating bits or other tools employed to rotate inwardly toward the work pieces. In instances when the bits or tools are rotated outwardly from the work pieces, with advancement of templates having wooden slabs clamped thereon, the wood frequently becomes split along the grain. Heretofore, it has been customary to employ bits with right cutting edges rotating toward work pieces with movement of templates and wood grasped thereon in one direction and to employ bits with left cutting edges rotating toward work pieces with movement of templates and wood grasped thereon in the opposite direction. Sometimes right and left cutting edge bits have been replaceably used in a single machine to produce scrolls, and sometimes scrolls have been produced on separate machines, one employing a bit having a right cutting edge and the other a bit having a left cutting edge.

The cutting bit assembly of this application incorporates a reversible cutting bit including first and second cutting edges and a construction and arrangement for causing one of said cutting edges to present itself to the work while the cutting bit is rotating toward said work with advancement of the template and wood in one direction and the other of said cutting edges to present itself to the work while said cutting bit is rotating toward the work with advance of said template and wood in the opposite direction. The reversible action cutting bit of the assembly of the invention can be employed to perform all of the operations necessary to produce scrolls.

In the accompanying drawing forming a part of this specification:

Fig. 1 is a plan view of a table and a work piece clamped to a template resting upon said table, the view also disclosing in transverse section, taken on line 1—1 in Fig. 2, a cutting bit blade of an assembly made according to the invention;

Fig. 2 is a vertical sectional view, taken on line 2—2 in Fig. 1, additionally disclosing, in elevation, an arbor, a chuck thereon and the cutting bit assembly as when applied to use;

Fig. 3 is an enlarged side elevational view of the cutting bit assembly as when removed from the arbor and chuck;

Fig. 4 is a longitudinal sectional view, taken on line 4—4 in Fig. 3;

Fig. 5 is a transverse sectional view, taken as on line 5—5 in Fig. 4; and

Fig. 6 is a view corresponding generally with the disclosure of Fig. 5, but showing the cutting bit of the assembly in a different position.

In Figs. 1 and 2 of the drawing, there is disclosed a table 10, to be vertically adjustable, and a guide pin 11 projecting above the top surface of the table. A template 12, for slidable engagement with the guide pin, rests freely on the table top, and a work piece 13, constituted as a slab of wood, is releasably grasped against the upper surface of the template by spaced clamps 14. An arbor 15, to be vertically adjustable, is above and longitudinally alined with the guide pin 11. A chuck 16 releasably secures a shank 17 of the cutting bit assembly to the arbor, a holder 18 of said assembly is integral with and below the shank, and a cutting bit 19 of the assembly is below and releasably secured in the holder. The shank, holder and cutting bit of the assembly are in longitudinal alinement and between and in vertical alinement with the arbor 15 and guide pin 11. The lower end of the cutting bit is in slightly spaced relation to the upper end of said guide pin.

A cylindrical opening 20 in and extending longitudinally of the holder 18 is for snugly, rotatably receiving a cylindrical hilt 21 of the cutting bit 19. Said cylindrical opening is off center with respect to the shank 17 and the holder 18.

A stop piece 22, in and at the base of the cylindrical opening 20, itself cylindrical as shown, integrally supports a downwardly extending first locating lug 23. A set screw 24 in an opening through an upper portion of the wall of the holder 18 bounding the cylindrical opening 20 is for releasably locking the stop piece 22 in said holder. The first locating lug 23 is bounded at the exterior thereof by a cylindrical surface constituted as a continuation of the cylindrical surface of the stop piece and at the interior thereof by a pair of flat stop surfaces, denoted 25 and 26, respectively, which extend inwardly of the cylindrical surface of said first locating lug in perpendicular relation to each other and meet at the longitudinal center of said stop piece. Each of the flat stop surfaces 25, 26 is in a plane passed longitudinally and diametrically through the cylindrical stop piece 22 and the cylindrical opening 20.

The upper end of the hilt 21 of the cutting bit 19 integrally supports an upwardly extending second locating lug 27 bounded at the exterior thereof by a cylindrical surface constituted as a continuation of the cylindrical surface of said hilt and at the interior thereof by a pair of flat stop surfaces, indicated 28 and 29, respectively, which extend inwardly of the cylindrical surface of said second locating lug in perpendicular relation to each other and meet at the longitudinal center of the hilt of said cutting bit. Each of the flat stop surfaces 28, 29 is in a plane passed longitudinally and diametrically through the cutting bit.

A blade 30 of the cutting bit 19, integral and vertically alined with the hilt 21, has first and second straight cutting edges, represented 31 and 32, respectively, situated at the opposite sides of said blade in parallel relation to said cutting bit and equally spaced from its longitudinal axis.

A retaining screw 33 in an opening through a lower portion of the wall of the holder 18 bounding the cylindrical opening 20 therein and having its inner end portion 34 situated in an annular slot 35 in and perpendicular to the hilt 21 of the cutting bit permits said hilt to be freely rotatable in said holder and maintains the upper surface of the hilt in sliding engaged relation with the lower surface of the stop piece 22. The first and second locating lugs 23 and 27 will be transversely alined when the hilt of the cutting bit is assembled with the holder, and the cutting bit will be rotatable through an arc of 180° selectively to bring the flat surface 28 of the second locating lug 27 into engagement with the flat surface 25 of the first locating lug 23 or to bring the flat surface 29 of said second locating lug into engagement with the flat surface 26 of said first locating lug.

In Fig. 5 of the drawing, the cutting bit 19 is rotating counterclockwise, the work piece is being moved upwardly, the flat surfaces 26, 29 of the first and second locating lugs 23, 27, respectively, are engaged, and the second cutting edge 32 is advancing toward said work piece. Advancement of the work piece into said second cutting edge will cause the flat surface 29 of the second locating lug 27 to become and remain engaged with the flat surface 26 of the first locating lug 23. In Fig. 6, said cutting bit is rotating clockwise, the work piece is being moved downwardly, the flat surfaces 25, 28 of the first and second lugs 23, 27, respectively, are engaged, and the first cutting edge 31 is advancing toward said work piece. Advancement of the work piece into said first cutting edge will cause the flat surface 28 of the second locating lug 27 to become and remain engaged with the flat surface 25 of the first locating lug 23. In both Figs. 5 and 6, the longitudinal axis of the hilt 21 of the cutting bit 19 is off center to the left of the longitudinal axis, indicated 36, of the shank 17 and the holder 18 of said cutting bit. The advancing first and second cutting edges 31 and 32 are radially spaced a greater distance from the longitudinal axis of the arbor 15 than are the trailing edges 32 and 31. Hence, the trailing edge of the blade 30 of said cutting bit will be in clearing relation to the work piece while the advancing edge thereof is operative on said work piece in response to rotation in either direction. In any installation, the construction and arrangement will be such that each of the first and second edges, such as 31 and 32, of the cutting bit, such as 19, will be at the side of the longitudinal axis of the arbor, shank and holder, such as 15, 17 and 18, of the machine toward which the hilt, such as 21, of the cutting bit is offset while performing its cutting operation, and at the opposite side of said longitudinal axis while trailing. As disclosed, the hilt of the cutting bit is off center 1/32", more or less, in the holder 18. The first and second edges 31 and 32 while cutting will travel in a circumference about 1/16" larger in diameter than while trailing. The eccentricity will provide relief necessary to maintain the trailing edges of the cutting bit blade 30 clear of work pieces being operated upon by advancing edges of said cutting bit blade and thus prevent dragging and burning.

What is claimed is:

1. A cutting bit assembly comprising a shank to be rigidly secured to an arbor in longitudinal alinement therewith for rotation in either direction, a holder longitudinally alined with said shank, there being a cylindrical opening in an end portion of the holder opposite the shank and extending longitudinally thereof in off center relation thereto, a cutting bit extending longitudinally of the assembly constituted as a cylindrical hilt rotatably mounted in said cylindrical opening and fixed against longitudinal movement in said holder and a blade disposed exteriorly of the holder and having first and second cutting edges in parallel relation to and situated at opposite sides, respectively, of the longitudinal axis of said cutting bit, and complemental stop means within the cylindrical opening and rigid with the cylindrical hilt and the holder, respectively, for limiting the extent of possible rotation of said cylindrical hilt in said holder, said complemental stop means being operable by reason of advancement of a work piece into cutting relation with said first and second cutting edges, respectively, in response to rotation of said shank and holder, to arrest rotation of the cutting bit in the holder and retain the first and second cutting edges, respectively, at the side of the longitudinal axis of the shank toward which the cutting bit hilt is off center while said first and second cutting edges, respectively, are advancing to make a cut and at the opposite side of said longitudinal axis while the first and second cutting edges, respectively, are trailing.

2. A cutting bit assembly comprising a shank to be rigidly secured to an arbor in longitudinal alinement therewith for rotation in either direction, a holder longitudinally alined with said shank, there being a cylindrical opening in an end portion of the holder opposite the shank and extending longitudinally thereof in off center relation thereto, a cutting bit extending longitudinally of the assembly constituted as a cylindrical hilt rotatably mounted in said cylindrical opening and fixed against longitudinal movement in said holder and a blade disposed exteriorly of the holder and having first and second cutting edges in parallel relation to and situated at opposite sides, respectively, of the longitudinal axis of said cutting bit, and complemental stop means within the cylindrical opening and rigid with the cylindrical hilt and the holder, respectively, for limiting the extent of possible rotation of said cylindrical hilt in said holder, said complemental stop means being operable by reason of advancement of a work piece into cutting relation with said first and second cutting edges, respectively, in response to rotation of said shank and holder, to arrest rotation of the cutting bit in the holder and retain the first and second cutting edges, respectively, in a first location at a side of and radially spaced from the longitudinal axis of the shank toward which the cutting bit hilt is off center while said first and second cutting edges, respectively, are advancing to make a cut and in a second location diametrically opposite said first location and spaced at less radial distance from said longitudinal axis than when at said first location while the first and second cutting edges, respectively, are trailing.

References Cited in the file of this patent

UNITED STATES PATENTS

| | | |
|---|---|---|
| 137,861 | Perrin | Apr. 15, 1873 |
| 1,008,436 | Richards | Nov. 14, 1911 |
| 1,663,225 | Widman | Mar. 20, 1928 |